Figure 1:
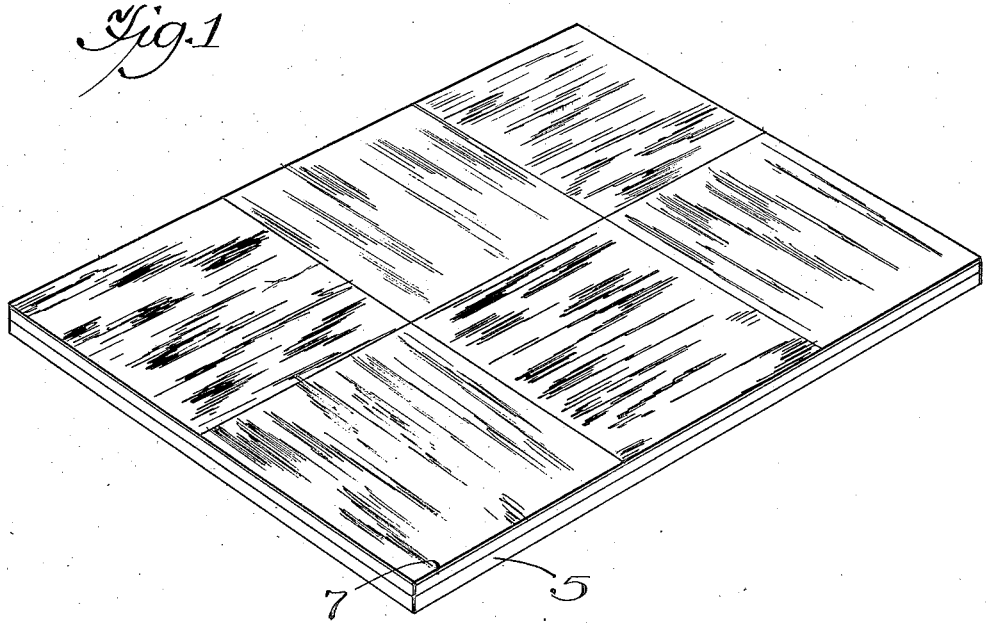

Nov. 3, 1936.　　　　E. G. BIRD　　　　2,059,203

SHEET RUBBER

Filed Nov. 18, 1933

Inventor,
Elmer G. Bird,

Witness:

Patented Nov. 3, 1936

2,059,203

UNITED STATES PATENT OFFICE 2,059,203

SHEET RUBBER

Elmer G. Bird, La Porte, Ind., assignor, by mesne assignments, to E. I. du Pont de Nemours and Company, Wilmington, Del., a corporation of Delaware Application November 18, 1933, Serial No. 698,610

1 Claim. (Cl. 18—59)

My present invention relates to improvements in sheet rubber and more particularly to sheet rubber which is designed for and used as floor coverings and in situations, such as for lining the pits of bowling alleys, where the service required of the covering or lining is more than usually severe.

I am aware that sheets of gassed or sponge rubber have heretofore been employed as backings or underlays for both textile floor coverings and sheet rubber which has not been gassed. I am also aware that sheets of gassed or sponge rubber have been cemented to overlays employed therewith, and it may be old, or at least not new with me, to produce and lay together a sheet of gassed or sponge rubber stock with a sheet of non-gassed rubber stock and cure or vulcanize the superposed sheets at the same time. In such combinations as are above referred to the sponge or gassed rubber underlay, by adding resiliency, materially increases the life and wearing qualities of the overlay, but where such a combination has heretofore been subjected to severe service it has merely been a matter of time before the gassed or sponge layer and the non-gassed layer are beaten or otherwise forced to separate, after which separation it is only a comparatively short length of time before the overlay is destroyed and the whole structure disintegrated.

I have discovered that sheet rubber comprising a layer of gassed or sponge rubber and a layer of non-gassed rubber may be so united as to resist and remain united under the severest service by adding to the non-gassed stock a relatively small amount of the ingredient for causing the gasification of the gassed layer whereby a relatively small amount of gasification takes place in the non-gassed layer. The process of vulcanization of two such layers appears to result in the driving of a very large proportion of the gas formed therein inwardly towards the juncture of the gassed and non-gassed layers where the layers are caused to commingle by the presence and action of the gas which they contain during vulcanization so that the layers of non-gassed and gassed rubber are not possible of separation even by the destruction of the product after vulcanization has been completed.

The presence of a relatively small amount of voids or cells in the non-gassed layer does not change its character or physical properties or its possibility of resisting wear as it is not possible, with the present known methods, to eliminate all the air from a composition prepared and treated for the production of non-gassed sheet rubber.

My present invention also permits me to secure a materially superior article having a tiled or mosaic effect in that with my product the broken surface layer characterizing a tiled or mosaic pattern has no tendency, even under the hardest service, to separate at the juncture of the tiles or areas going into the mosaic.

I have accomplished the foregoing results in the manner hereinafter described and as illustrated in the accompanying drawing in which—

Figure 2:
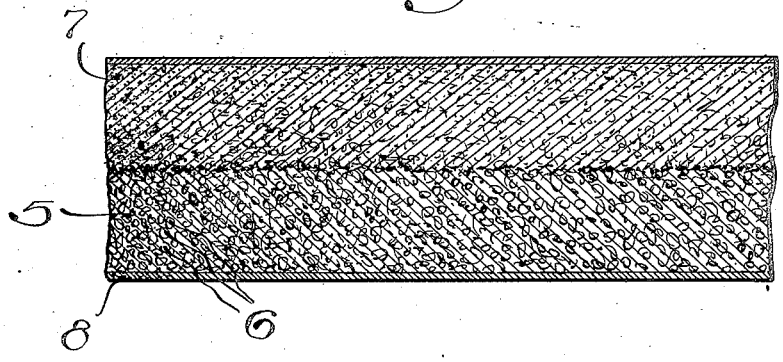

Fig. 1 is a perspective of a section of rubber sheet having a marbled tiled design embodying my present invention; and Fig. 2 is a fragmental detail section transverse of the top and bottom layers.

Similar reference characters have been employed for designating similar elements in the respective views.

The bottom layer 5 may be made in accordance with any of the present well known formulae for producing sponge rubber with a desired size of interstitial cavities or voids 6. Such gasifying elements may be a salt such as bicarbonate of soda and an acid, or even an excess of water which is caused to vaporize by the heat employed in vulcanization, although a gasification caused by steam is subject to more or less collapsing of the cavities upon the condensation of the steam.

The upper layer 7 may be compounded in accordance with any desired known formula for producing non-gassed rubber sheets to which is added a very small amount of the same elements employed in the lower sheet for causing gasification, or in case of the top layer 7 an excess of water for producing gasification may advantageously be employed as in this case the collapsing of the cavities upon the condensation of the steam will tend to assist in the attainment of the desired object. The respective layers 6 and 7 are produced by calenders from stock taken from the usual grinding and mixing machines and laid one upon the other before they are conveyed between the plates of a press and vulcanized by heat in the ordinary manner.

In producing a tiled or mosaic pattern the portions constituting the upper layer 7 have to be died out of the sheet as it comes from the calender and laid upon the layer 6 in their desired arrangement, otherwise the process of manufacture is precisely the same.

As is well known, sponge rubber sheets as now made where they contact the mold have an outside layer or skin 8 which forms the bottom of my new rubber sheet and constitutes quite sufficient of a base therefor as this side remains permanently in position and is subjected to no wear.

Having described my invention what I claim as new and desire to secure by Letters Patent is:

Sheet rubber which comprises a layer of vulcanized sponged rubber on one side, a layer of vulcanized rubber on the other side which contains a sponging agent limiting the sponging of the rubber to only a slight amount, and an intermediate portion of rubber coalesced with the inner portion of said vulcanized sponge rubber and the inner portion of said vulcanized rubber which constitutes commingled portions of each of said layers, said sheet having no line of demarcation between the layers thereof.

ELMER G. BIRD.